Oct. 16, 1962 S. DUINKER ET AL 3,058,200

METHOD OF ORIENTING IN COPLANAR ARRANGEMENT
THE GAPS OF A PLURALITY OF MAGNETIC HEADS

Filed Jan. 11, 1960

INVENTORS
S. DUINKER &
JULES BOS

BY Frank R. Jifani
AGENT 3,058,200

METHOD OF ORIENTING IN COPLANAR ARRANGEMENT THE GAPS OF A PLURALITY OF MAGNETIC HEADS

Simon Duinker and Jules Bos, Eindhoven, Netherlands, assignors to North American Philips Company, Inc., New York, N.Y., a corporation of Delaware Filed Jan. 11, 1960, Ser. No. 1,580
Claims priority, application Netherlands Jan. 15, 1959
4 Claims. (Cl. 29—155.56)

The invention relates to a method of orienting in coplanar arrangement the gaps of a plurality of magnetic heads with the aid of a reference plane, these heads forming together one multiple magnetic head for recording, reproducing or erasing. Although the problem concerned dates as far back as the instant when the manufacture of multiple magnetic heads was taken in hand, no satisfactory solution has hitherto been suggested. It was believed by some people that a solution could be found in an elaborate, optical orientation with the aid of a microscope. Others sought the solution in the choice of a reference plane, which was determined by the inner side of a profiled half of the head. It was overlooked that the distance between the said inner side and a plane parallel thereto and going through the gap can never be precisely constant. These solutions have not yielded the result desired in practice.

This problem urgently demands a solution the more so as, nowadays, such a high resolving power is required for the magnetic recording and reproducing heads that they are suitable for the magnetic recording of television or radar signals or for use in computers; this requirement can be fulfilled only by magnetic recording and reproducing heads which have gap lengths (distance measured across gap in direction of tape movement) of the order of $2\mu$ (2 microns). In practice it has been found that such heads can be manufactured only from oxidic, magnetic material, for example, a ferrite, while glass is to be sealed in for defining the gap. Optical orientation could, indeed, be carried out with a head having not more than three channels, but in the case of a head with, for example, 20 channels, the variation in the movement of the microscope sledge is already so great that it is unfeasible to maintain gap lengths of about 2 microns. Heads having gap lengths of the said order involve a further complication in that the gap height (depth of gap measured in plane perpendicular to tape) must be also comparatively small (of the order of 0.1 mm.), since otherwise the magnetic reluctance of the gap would be too small and hence the efficiency of the head too low. This condition brings about severe requirements for the orientation in a direction at right angles to the orientation of the gaps, i.e. at right angles to the gap length.

The method according to the invention tends to overcome the aforesaid difficulties by choosing, as a reference plane, a plane which is a prolongation of the gap plane or gap defining surface of the individual heads. The prolongation of the gap is to be understood to mean not only that part of the said plane which extends above the head, but also that part of the said plane which is located inside the head or projects inwardly beyond the gap defining surfaces or gap depth. In all these cases, the front surface of the multiple head is subjected to an after-treatment in order to obtain a uniform surface, which may be cylindrically rounded off, to apply thereto the magnetic carrier, a stop being provided in each case to obtain the same gap height for the individual heads.

The invention furthermore relates to a multiple recording- and reproducing-head, in which the individual gaps are oriented in co-planar arrangement by the method according to the invention.

The invention will be described more fully with reference to one embodiment shown in the figures of the accompanying drawing, in which FIG. 1 shows a magnetic recording and reproducing head, which is provided in accordance with the invention with a reference surface or plane projecting beyond the head, and FIG. 2 is a side elevation of a multiple magnetic recording and reproducing head, which has an internal reference surface or plane.

Figure 1:
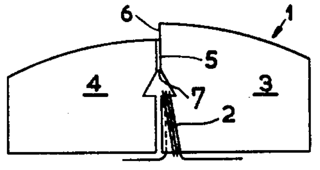

Referring to FIG. 1, reference numeral 1 designates a magnetic recording and reproducing head comprising a coil 2, a spacing plate or spacer 5 being arranged or, if made of glass, sealed in between the gap surfaces of the head halves 3 and 4. The gap surfaces of the head halves defining gap length L have unequal heights $H_1$, $H_2$ and are polished throughout their surfaces. After assembling of the halves to obtain a single head, the part 6 of the gap surface of the head half 3, projecting beyond the gap, may be chosen as a reference surface. The desired orientation of the gaps of a plurality of heads as shown in FIG. 1 is carried out by arranging these heads in a holder (8 in FIG. 2), in which a stop is provided to ensure that the lower sides 7 in the gap height are flush with each other while the projecting reference surface 6 is urged against a rule (not shown) to align the gaps, after which the heads are fixed in position in any known manner in a holder. Finally the front surface of the multiple magnetic recording and reproducing head is subjected to an after-treatment (final profiling operation) so that all gaps are not only orientated in a coplanar arrangement but also have the same dimensions.

Figure 3:
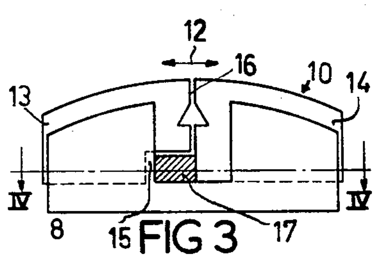
FIG. 3 is a sectional view taken on the line III—III of FIG. 2.
Figure 2:
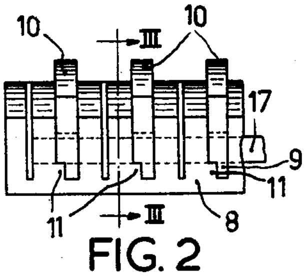
Figure 4:
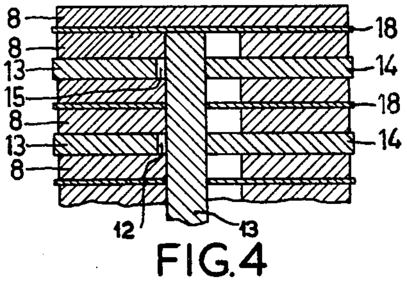
FIG. 4 is a sectional view taken on the line IV—IV of FIG. 3.

FIGS. 2, 3 and 4 illustrate a case in which the surface extension of oneof the gap defining surfaces of the two head halves, located inside the head, is chosen as a reference surface.

FIG. 2 shows a holder 8, provided with a plurality of slots 9, in which the heads 10 are arranged at the correct height by means of a stop 11. In the said slots the heads are displaceable in the direction of the arrow 12 (see FIG. 3) before they are fixed in position after orientation. Before the heads are arranged in the holder, the opposite surfaces of the two head halves 13 and 14 are polished throughout their length. After polishing, for example, the head half 13 is recessed as at 15 so that over a given distance below the gap the other, non-recessed head half 14 has a gap defining surface extension or reference plane facing the recess 15 of head half 13. Then the head halves are secured to each other to form one unit with the interposition of a spacer 16. After each individual head with the associated winding (see FIG. 1) has been treated in a similar manner, the heads are arranged in the slots 9 concerned of the holder 8. Then a rectangular beam 17 is taken through the spaces 15, the side of this beam, facing the head half 14, being planar and smoothly polished. The orientation is carried out by urging the reference surfaces or gap defining surface extensions of the head halves 14 against the cooperative planar reference surface of the beam 17. In this position the heads are fixed and each gap of a plurality of spaced parallel heads lies in a single plane. Between the separate magnetic heads 10, metal plates of high permeability may be provided, subsequent to the orientation, for protection. Finally the front surface of the multiple magnetic head is rounded off cylindrically and abraded to obtain the desired gap height or depth.

It should be noted, as shown in FIGS. 3 and 4 the width of the recess 15 is greater than the width of beam 17 to allow the beam to pass freely through the heads 10 even though the width of the beam 17 is not uniform over its length. In fact, it will be apparent that care need not be exercised to provide a beam 17 with anything but a single planar surface.

What is claimed is:

1. A method of assembling a plurality of magnetic heads in spaced parallel relation having coplanar head gaps comprising the steps of providing one head half of each magnetic head to be assembled with a gap defining surface extension projecting beyond the gap defining surface of an associated head half, urging the projecting surface extension of each said one head half into intimate contact with unitary means having a planar surface contacting the surface extensions of each said one head half, and securing each of a plurality of said one head halves and an associated head half in spaced parallel relation.

2. A method of assembling a plurality of magnetic heads in spaced parallel relation having coplanar head gaps comprising the step of providing a plurality of magnetic heads in which one head half of each head of said plurality has a gap defining surface extension projecting beyond the opposite head half, urging said surface extensions of each said head into intimate contact with unitary means having a planar surface contacting said surface extensions and securing said plurality of heads in spaced parallel relation.

3. A method according to claim 1 wherein said extension of said gap defining surface projects outwardly from said assembled head.

4. A method according to claim 1 wherein said extension of said gap defining surface projects inwardly of said assembled head.

References Cited in the file of this patent

UNITED STATES PATENTS

| | | |
|---|---|---|
| 2,700,588 | Williams et al. | Jan. 25, 1955 |
| 2,706,752 | Dupy | Apr. 19, 1955 |
| 2,769,866 | Kornei | Nov. 6, 1956 |
| 2,872,530 | Jolly | Feb. 3, 1959 |
| 2,916,560 | Mathez | Dec. 8, 1959 |
| 2,921,143 | Selsted et al. | Jan. 12, 1960 |

FOREIGN PATENTS

| | | |
|---|---|---|
| 201,310 | Austria | Dec. 27, 1958 |
| 852,533 | Great Britain | Oct. 26, 1960 |